UNITED STATES PATENT OFFICE.

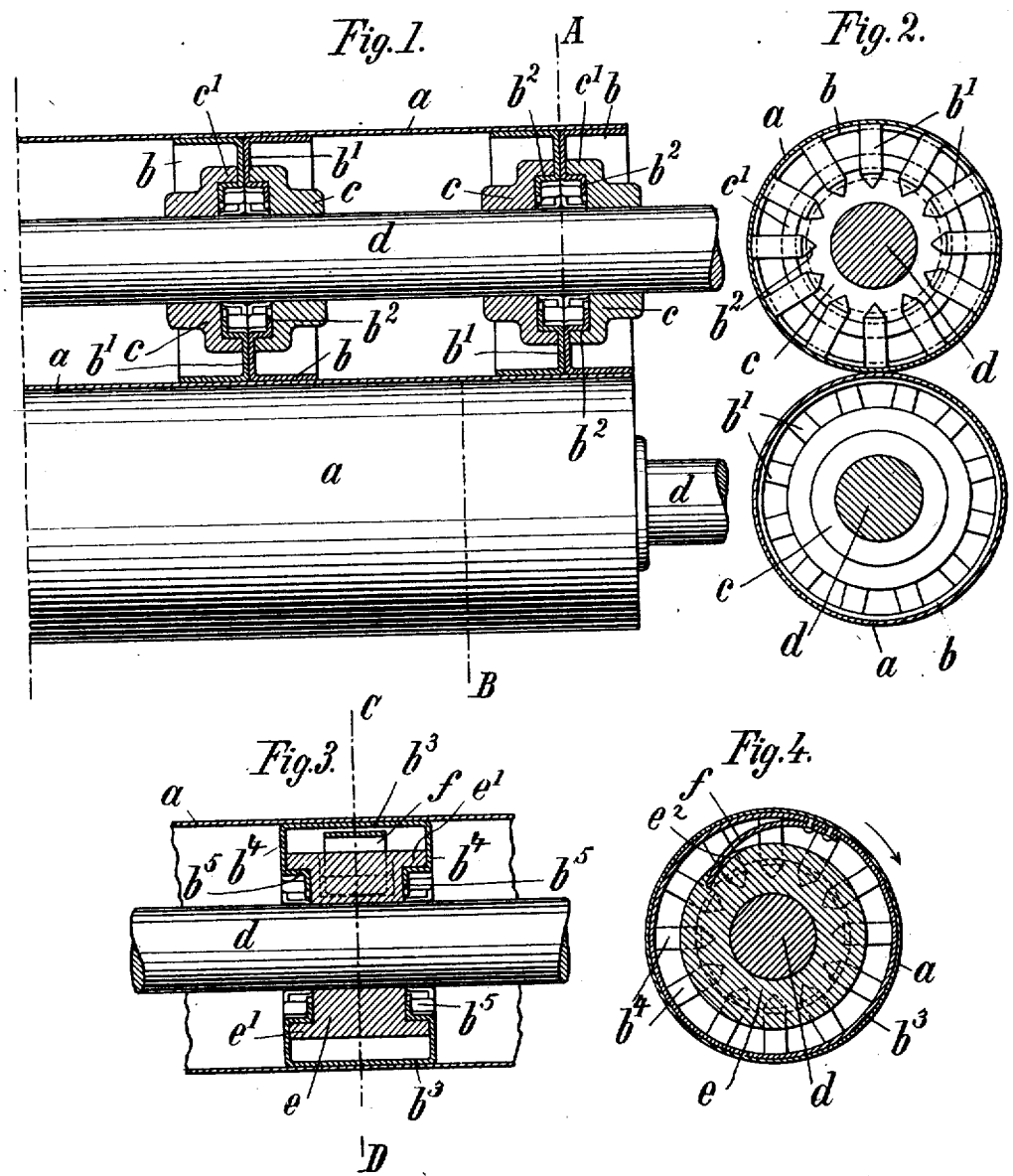

GEORG LOUIS ALBERT KAPP, OF HAMBURG, GERMANY.

ROLLER FOR WRINGING-MACHINES, MANGLES, AND THE LIKE.

No. 903,096.　　　Specification of Letters Patent.　　　Patented Nov. 3, 1908.

Application filed March 28, 1907. Serial No. 365,072.

*To all whom it may concern:*

Be it known that I, GEORG LOUIS ALBERT KAPP, a subject of the German Emperor, and resident of Hamburg, Germany, whose post-office address is 9ª Bahrenfelderstrasse, have invented certain new and useful Improvements in Rollers for Wringing-Machines, Mangles, and the Like, of which the following is a specification.

The present invention relates to improvements in rollers for wringing machines, mangles and the like, the object of the improvements being to produce a pressure-roller having an elastic, non-absorbing surface.

The object of my invention is to dispense with the employment of india rubber coated rollers, and even solid india rubber rollers now in use, and, my improved roller consists of a shaft provided with a plurality of rigid hubs, disks or collars, a slightly flexible metal tube and a plurality of flexible supporting rings placed, preferably in pairs and some distance apart, in the metal tube and having a number of radial arms yieldingly engaging suitable flanges or the like of the hubs, disks or collars.

In order that my invention may be more fully understood, I shall now proceed to describe the same in detail, reference being taken to the accompanying sheet of drawings, in which Figure 1 is a front elevation, partly in longitudinal section, of a pair of my improved wringing rollers constructed in accordance with and embodying my invention; Fig. 2 is a cross section on the line A B Fig. 1; Fig. 3 is a longitudinal sectional view illustrating a constructional modification of my improved roller; and Fig. 4 is a cross section of the same on the line C—D.

Similar letters of reference refer to similar parts throughout the several figures.

According to Figs. 1 and 2 the roller consists of a comparatively thin and smooth metal tube or sleeve $a$ slightly flexible or yielding in radial direction and provided in its interior with a plurality of thin flexible metal rings $b$ having each a number of radial arms $b^1$ with hookshaped ends $b^2$ engaging a suitable flange $c^1$ of a collar or disk $c$ keyed or fixed otherwise on a shaft $d$. The metal rings $b$ with arms $b^1$ and hooks $b^2$, as well as the collars $c$ are arranged in pairs as this is obvious from Fig. 1 without any further explanation. The tube and ring are yieldingly held together by their tension which also holds the arms $b'$ in contact with the collar.

When two of the described rollers contacting with their surfaces, as shown in Fig. 1, are pressed against each other, they do flatten slightly along the line of contact, as do also the metal rings $b$. By this flattening of the tubes $a$ and rings $b$ the arms $b^1$ which are in the proximity of the place of pressure, particularly the arms $b^1$ being in the line connecting the centers of the two rollers, are caused to slide or move to some extent inwardly in radial direction, whereby the hooks $b^2$ of these arms $b^1$ are disengaged or lifted off from the flanges $c^1$, whereas the hooks $b^2$ of the diametrically opposite arms $b^1$ are pressed so much the more against the flanges $c^1$, so that a reliable frictional coupling is established between the supporting means $b$ $b^1$ $b^2$ and the disks or collars $c$ and each tube $a$ is carried round by its rotating shaft $d$; each tube invariably flattening out with elastic or yielding pressure at the part or line at which the work takes place.

In the modification shown in Figs. 3 and 4, I provide, in place of the rings $b$, a single ring $b^3$ on each edge of which are a plurality of radial arms $b^4$ having hooked ends $b^5$ which take under a peripheral flange $e'$ formed on each side of a collar $e$ fixed on the shaft $d$.

The friction between the ends $b^5$ and the under faces of the flanges $e'$ is sufficient to cause the ring and collar to rotate in unison, but to prevent any liability of the collar rotating independently of the ring, a locking pawl may be provided. This pawl consists of a spring $f$ having one end secured to the ring, and its free end engaging a notch $e^2$ formed in the periphery of the collar, as shown in Fig. 4.

I claim:

1. A roller comprising a yielding tube, a flanged member therein, a resilient ring engaging the inner periphery of said tube and having a plurality of arms engaging the flanges on said member.

2. A roller comprising a yielding tube, a flanged member therein, a resilient ring engaging the inner periphery of said tube and having a plurality of arms having hooked ends taking under the flanges of said member.

3. In a roller, the combination of a shaft, a collar mounted thereon, a yielding tube encompassing the collar, and a resilient ring engaging the inner periphery of the tube and having a plurality of arms engaging the collar.

4. In a roller, the combination of a shaft, a flanged collar fixed thereon, a yielding tube encompassing the collar, a resilient ring engaging the inner periphery of the tube and a plurality of arms on the ring having their free ends engaging the flange of the collar.

5. In a roller, the combination of a shaft, flanged collars fixed thereon in pairs, a radially yielding tube encompassing the shaft, resilient rings arranged in pairs engaging the inner periphery of the tube, and a plurality of abutting spoke-like arms having hooked ends adapted to engage the flanges.

GEORG LOUIS ALBERT KAPP.

Witnesses:
MAX A. G. LEMCKE,
ERNEST H. L. MUMMENHOFF.